UNITED STATES PATENT OFFICE.

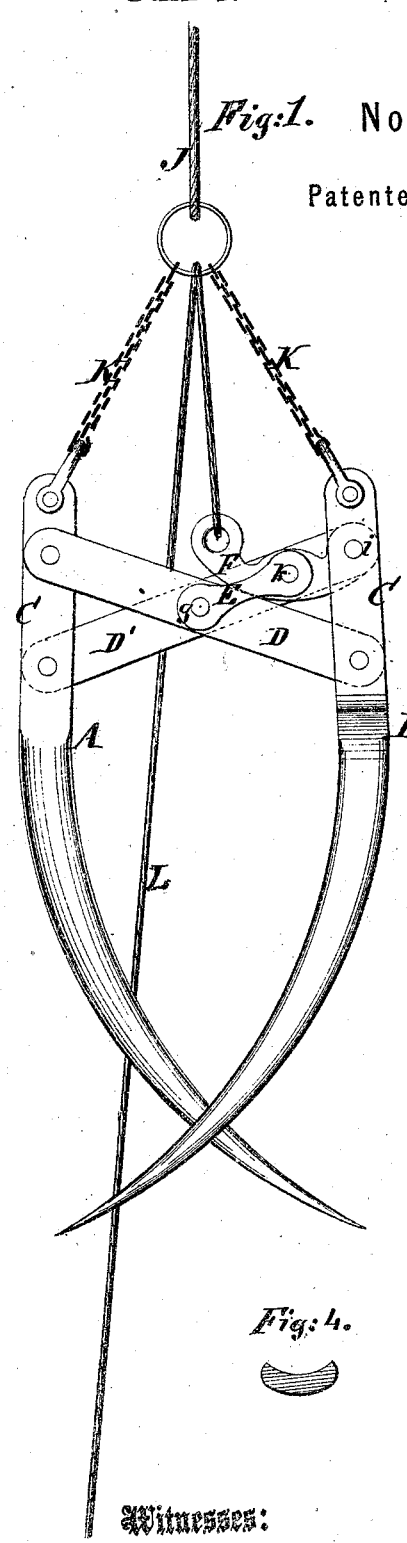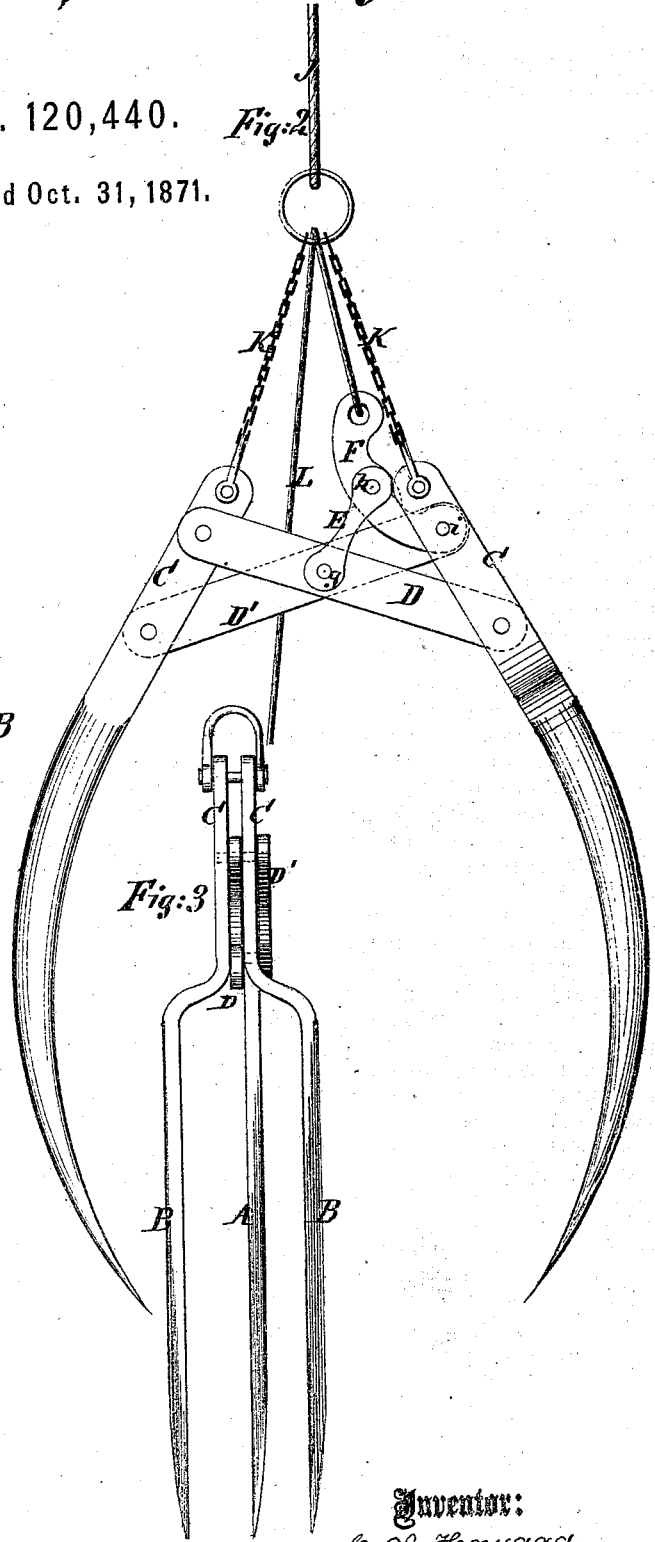

CHARLES A. HOWARD, OF PONTIAC, MICHIGAN.

IMPROVEMENT IN HORSE HAY-FORKS.

Specification forming part of Letters Patent No. 120,440, dated October 31, 1871.

*To all whom it may concern:*

Be it known that I, CHARLES A. HOWARD, of Pontiac, in the county of Oakland and State of Michigan, have invented a new and useful Improvement in Horse Hay-Forks; and I do hereby declare that the following is a full, clear, and exact description thereof, which will enable others skilled in the art to make and use the same, reference being had to the accompanying drawing forming part of this specification.

My invention consists in improving horse hay-forks, as hereinafter fully described and subsequently pointed out in the claims.

In the accompanying drawing, Figure 1 is a front view of the fork, showing it closed. Fig. 2 is a view, showing it open. Fig. 3 is a side view; and Fig. 4 is a cross-section of one of the tines.

Similar letters of reference indicate corresponding parts.

A and B represent the two parts of the fork. As usually made, one part, A, is a single tine or prong, while B has two prongs. C represents the shanks of the tines or prongs. From the shanks down, each of the tines is formed of a single corrugation or longitudinal section of a tube, tapered to a point, as seen in the drawing. By making the tines in this form they are prevented from bending laterally, while the requisite lightness is preserved. D D' are the connecting-bars, which are crossed and pivoted to the shanks, as seen in the drawing. This allows the tines (or the fork) to be opened and closed more or less, as seen in Figs. 1 and 2. E is the tripping device, pivoted to the bar D and to the tripping-lever F. The latter is pivoted between the shanks of the two-tined part B, as is also the connecting-bar D. The operation of the tripping device will be readily understood from the drawing. When the fork is loaded the three pivots $g$, $k$, and $i$ are on a line. The fork is suspended from the rope J by means of the chains K K. L is the tripping-cord attached to the lever F. When the lever F is in the position seen in Fig. 1 the fastening is complete. The fork may be carried anywhere with its load. A twitch on the tripping-cord throws the lever up and allows the parts of the fork to spread and discharge the load, as seen in Fig. 2.

By connecting the parts of the fork by the bars D D', and connecting the tripping device therewith, as shown, the fork is made strong and durable, and the form of the tines prevents any lateral strain from bending them.

The advantages of this mode of constructing power hay-forks must be obvious to all who are acquainted with this useful farming implement.

Having thus described my invention, I claim as new and desire to secure by Letters Patent—

1. In combination with shanks C C, the crossed coupling-braces D D', forming the only pivotal connection between said shanks, and adapted to be used in the manner specified.

2. The combination of the parts A B, connecting-bars D D', the tripping device E, and lever F, substantially as and for the purposes described.

CHARLES A. HOWARD.

Witnesses:
GEO. W. MABEE,
ALEX. F. ROBERTS.

(77)